United States Patent
Yang et al.

(10) Patent No.: US 6,291,577 B1
(45) Date of Patent: Sep. 18, 2001

(54) METHOD FOR SCAVENGING MOISTURE IN POLYISOCYANATES AND FORMULATIONS THEREOF

(75) Inventors: Hui Shirley Yang, East Windsor; Paul Ling-Kong Hung, Watchung, both of NJ (US)

(73) Assignee: Rhodia Inc., Cranbury, NJ (US)

( * ) Notice: Subject to any disclaimer, the term of this patent is extended or adjusted under 35 U.S.C. 154(b) by 0 days.

(21) Appl. No.: 09/546,792

(22) Filed: Apr. 11, 2000

(51) Int. Cl.$^7$ .............................. C08K 5/13; C08K 5/41; C08L 75/00; C09K 15/08
(52) U.S. Cl. .................... 524/589; 524/349; 524/350; 524/171; 252/194
(58) Field of Search ...................... 524/589, 349, 524/350, 171; 252/194, 184

(56) References Cited

U.S. PATENT DOCUMENTS

| | | | |
|---|---|---|---|
| 3,715,381 | * 2/1973 | Spaunburgh et al. ............... | 560/333 |
| 4,614,786 | 9/1986 | Goel et al. .............................. | 528/60 |
| 4,690,953 | * 9/1987 | Orr et al. ................................ | 521/65 |
| 5,095,069 | * 3/1992 | Ambrose et al. ..................... | 524/591 |
| 5,096,993 | * 3/1992 | Smith et al. ........................... | 528/61 |
| 5,223,174 | 6/1993 | Chou et al. .......................... | 252/194 |
| 5,264,148 | 11/1993 | Chou et al. .......................... | 252/194 |
| 5,328,635 | 7/1994 | Chou et al. .......................... | 252/194 |
| 5,354,834 | * 10/1994 | Yoshida et al. ....................... | 528/59 |
| 5,410,011 | * 4/1995 | Konishi et al. ....................... | 528/73 |
| 6,008,462 | * 12/1999 | Soltwedel ............................ | 219/91.2 |

* cited by examiner

*Primary Examiner*—Vasu Jagannathan
*Assistant Examiner*—Callie E. Shosho

(57) ABSTRACT

Scavenging moisture from a polyisocyanate useful for preparing thermosetting polyurethane coatings therefrom is accomplished by admixing with the polyisocyanate a t-butylated hydroxytoluene and an alkyl ester of toluenesulfonic acid in which the alkyl ester comprises at least 90% para ester, thereby improving the shelf life of the polyisocyanate.

24 Claims, No Drawings

METHOD FOR SCAVENGING MOISTURE IN POLYISOCYANATES AND FORMULATIONS THEREOF

FIELD OF THE INVENTION

This invention relates to moisture scavenging compositions, and more particularly to moisture scavenging compositions useful for scavenging moisture in substantially anhydrous and dilute polyisocyanates, particularly polyisocyanate oligomers and prepolymers, to be used to prepare thermosetting polyurethane coatings, films and the like therefrom. The polyisocyanates can also be used to form adhesives, sealants and elastomers.

BACKGROUND OF THE INVENTION

Moisture-curable thermosetting polyurethanes are widely known as protective and decorative coatings or films in a broad range of applications, such as for example, coatings or films for walls, buildings, machinery, vehicles, equipment and other surfaces in need of a protective coating. These moisture-curable polyurethanes are prepared from polyisocyanate oligomers or prepolymers.

Moisture-curing polyurethane coating systems include a polyisocyanate oligomer component which reacts with atmospheric water at room temperature to form useful films. These systems also include pigments, organic solvents, and a variety of adjuvant components, e.g., surface active agents, dispersants, diluents, and fillers. This type of coating is one of the finest coatings available that can be produced without the application of heat or other external sources of energy. These systems are very useful for objects that cannot be heat-cured, such as buildings, large machinery, airplanes, ships and vehicles.

Two component thermosetting polyurethanes are widely used in protective coatings or films in a broad range of applications, such as for example, coatings for automotive machinery, equipment, and other surfaces in need of a protective coating. These room temperature-curable polyurethanes are prepared from polyisocyantes.

Two component polyurethane coating systems include a polyisocyanate component which reacts with polyol resin, such as an acrylic polyol or polyester polyol, to form useful films. The system also includes pigments, organic solvents, and a variety of adjuvant components, e.g., surface active agents, dispersants, diluents, and fillers. This type of coating is one of the finest coatings available that can be produced without the application of heat or other external sources of energy. They are very useful for objects that cannot be heat-cured, such as large machinery, airplanes, ships and vehicles.

Since the polyisocyanate component reacts with even trace amounts of moisture, extreme care must be taken so that the polyisocyanate does not contact water until they are applied to a surface to be coated. Water is, however, unintentionally and unavoidably introduced into the formulation process in the form of dissolved water in solvents, adsorbed and absorbed water in fillers and pigments, and atmospheric moisture. Subsequent reaction of the water with the polyisocyante component of the system results in an irreversible reaction which will produce carbamic acid. The carbamic acid is unstable at room temperature and decomposes into carbon dioxide and a primary amine. The primary amine is reactive with the polyisocyanate producing a urea and resulting in a turbid formulation or precipitation of crystals of polyurea. The polyisocyanate formulation then becomes generally unusable for forming thermosetting polyurethanes possessing excellent coating properties.

A number of moisture scavengers have been suggested or marketed for moisture scavenging in such polyisocyanate oligomer or prepolymer formulations. Among the many commercially available moisture scavengers are monomeric monoisocyanates such as p-toluene sulfonyl isocyanate, a Zoldine MS Plus product based on oxazalidone, an Incozol 2 based oxazolane, an orthoformate based additive known as OF, and trimethyl orthoformate (TMOF) and trimethyl orthoacetate (TMOC), moisture scavengers. The monomeric isocyanates are generally toxic and considered to be a health hazard. Moreover, on addition to the polyisocyanate oligomer, it causes yellowing when stored over time. The MS Plus product also causes yellowing over time when put into contact with polyisocyanate oligomers or prepolymers. Incozol 2 reacts with water to form an aminoalcohol and 2-ethyl hexanal. The aminoalcohol will react with the polyisocyanate as a chain extender without forming the desired product. The orthoformates and orthoacetates also undesirably readily react with water. The products will form precipitates or cause turbidity in the polyisocyanate solutions.

There is therefore a need for a non-toxic moisture scavenger composition which will effectively and safely isolate water from the polyisocyanates formulations and to do so without causing the aforesaid undesirable occurrences and without adversely effecting the performance and properties of the resulting thermosetting polyurethanes produced from the polyisocyanates.

SUMMARY OF THE INVENTION

It has been discovered in accordance with this invention that moisture can be scavenged from polyisocyanates formulations by admixing with the polyisocyanate a moisture scavenging effective amount of:

(a) a t-butylated hydroxytoluene selected from the group consisting of 2,6-ditertiarybutyl hydroxytoluene and 2-tertiarybutyl hydroxytoluene, and (b) an alkyl ester of toluenesulfonic acid comprising at least 90% para alkyl ester, optionally in at least one organic solvent.

The invention further comprises a polyisocyanate formulation suitable for use in preparing thermosetting polyurethanes therefrom in which the moisture scavenging effective amount of the t-butylated hydroxytoluene and alkyl ester of toluenesulfonic acid comprises from about 0.3 to about 0.7 weight % based on the total weight of the polyisocyanate formulation.

Another aspect of this invention provides a moisture scavenging composition for use in scavenging moisture in a polyisocyanate formulation useful for preparing thermosetting polyurethanes therefrom, the moisture scavenging composition comprising:

(a) a t-butylated hydroxytoluene selected from the group consisting of 2,6-ditertiarybutyl hydroxytoluene and 2-tertiarybutyl hydroxytoluene, and (b) an alkyl ester of toluenesulfonic acid comprising at least 90% para alkyl ester, (c) optionally, at least one organic solvent, wherein the weight ratio of alkyl ester of toluenesulfonic acid to t-butylated hydroxytoluene is in the range of from about 2:1 to about 10:1.

By this invention, the shelf life of the polyisocyanate is improved.

DETAILED DESCRIPTION OF THE INVENTION AND PREFERRED EMBODIMENTS

The moisture scavenging composition and the components thereof for addition to polyisocyanate formulations are non-toxic and are not a health hazard. Moreover, their use as moisture scavengers in the polyisocyanate formulations do not cause any significant yellowing or cause any precipitation to occur in dilute solutions of the polyisocyanate. The moisture scavenging components of this invention are especially useful in Tolonate hexamethylene polyisocyanate oligomers of Rhodia, Inc. where some other commercially available moisture scavengers are not effective or cause the formation of precipitation.

The moisture scavenging compositions of this invention comprise a combination of a t-butylated hydroxytoluene and an alkyl ester of toluenesulfonic acid in which the alkyl ester is at least 90% para alkyl ester. The alkyl ester of toluenesulfonic acid is preferably a $C_1$ to $C_{12}$ alkyl ester, more particularly a $C_1$ to $C_8$ alkyl ester and most preferably a $C_1$ to $C_4$ alkyl ester, particularly methyl para-toluenesulfonate (MTS). The t-butylated hydroxytoluene is preferably 2,6-ditertiarybutyl hydroxytoluene, available commercially as Ionol.

The weight ratio of alkyl ester of toluenesulfonic acid to t-butylated hydroxytoluene employed in the moisture scavenging composition and process of this invention is generally in the range of from about 2:1 to about 10:1, preferably from about 3:1 to about 7:1 and most preferably from about 4:1 to about 6:1.

The two moisture scavenging components will generally be employed in an amount such as to provide from about 0.1 to about 3.0 weight %, preferably from about 0.2 to about 2.0 weight %, most preferably from about 0.3 to about 0.7 weight % of these components based on the total weight of the polyisocyanate formulation in which they are admixed.

The moisture scavenging components of this invention can be employed in any suitable polyisocyanate to be used to produce thermosetting polyurethanes therefrom. Such polyisocyanates can be monomeric polyisocyanates or polyisocyanate oligomers or prepolymers with some pendant NCO groups. The monomeric polyfunctional isocyanates have the general formula:

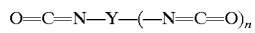

wherein Y is a substituted or unsubstituted aromatic, aliphatic or cycloaliphatic polyvalent group and n is or 1 or more. Examples of suitable isocyanates are isophorone diisocyanate, 1,3- and 1,4-cyclohexane diisocyanate, 1,2-ethylene diisocyanate, 1,4-tetramethylene diisocyanate, 1,6-hexamethylene diisocyanate, 2,2,4 and 2,4,4-trimethyl-1,6-hexamethylene diisocyanate, 1,12-dodecane diisocyanate, α,α'-diisocyanatodipropyl ether, 1,3-cyclobutane diisocyanate, 2,2- and 2,6-diisocynanato-1-methylcyclohexane, 2,5 and 3,5-bis(isocyanatomethyl)-8-methyl-1,4-methano-decahydronaphthalene, 1,5-, 2,5-, 1,6- and 2,6-bis(isocyantomethyl)-4,7-methanohexahydroindane, 1,5-, 2,5- and 2,6-bis(isocyanato)-4,7-methanehexahydroindane, 2,4'- and 4,4'-dicylohexyl diisocyanate, 2,4- and 2,6-hexahydrotolylene diisocyanate, perhydro-2,4'- and 4,4'-diphenylmethane diisocyanate, α,α'-diisocyanato-1,4-diethylbenzene, 1,3-and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanato diphenylmethane, naphthylene 1,5-diisocyanate, 2,4- and 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylylene diisocyanate, 2,4,4'-triisocyanatodiphenyl ether, 4,4',4"-triisocyanatotriphenylmethane, and the like and mixtures thereof. As examples of such polyisocyanate oligomers, there may be mentioned hexamethylene diisocyanate trimers (HDI-trimers) such as Tolonate HDT from Rhodia, Inc. Examples of other suitable polyisocyanate oligomers are aliphatic polyisocyanate oligomers such as isophorone diisocyanate biuret or trimer, asymetric hexamethylene diisocyante trimer, and high functionality, low viscosity hexamethylene diisocyanate derivatives, and norbornene diisocyanate biurets and trimers.

The moisture scavenger components of this invention are particularly effective in moisture scavenging for substantially anhydrous, dilute solutions of polyisocyanate oligomers, such as solvent solutions of such polyisocyanate oligomers containing from about 40 to about 90 weight % solvent.

The moisture scavenging compounds of this invention may be added to the polyisocyanates, optionally in any suitable organic solvent compatible with the moisture scavenger compounds and the polyisocyanate oligomers, such as aprotic solvents such as for example, ketones, esters, ethers, glycol esters, glycol ether esters, halogenated hydrocarbons, and alkyl and aromatic hydrocarbons. Especially preferred is butyl acetate solvent.

The invention is illustrated by, but not limited to, the following examples conducted with Tolonate HDT (hexamethylene diisocyanate trimer). The stability of Tolonate HDT (in 40% n-butyl acetate solvent) alone and with various additional components was observed for a period of up to eleven weeks at 50° C. following preparation of the formulations.

The formulations evaluated are set forth in Table I in which the amounts are expressed in parts by weight.

TABLE 1

Formulations Evaluated

| Formulation No. | Tolonate HDT | n-butyl acetate* | TMOC | TMOF | p-TSI | Incozol 2 | Inventive Composition |
|---|---|---|---|---|---|---|---|
| 1 | 40 | 60 | | | | | |
| 2 | 40 | 60 | 0.5 | | | | |
| 3 | 40 | 60 | | 0.5 | | | |
| 4 | 40 | 60 | | | 0.5 | | |
| 5 | 40 | 60 | | | | 0.5 | |
| 6 | 40 | 55.75 | | | | | 4.25 |
| 7 | 40 | 55.75 | 0.5 | | | | 4.25 |

TABLE 1-continued

Formulations Evaluated

| Formulation No. | Tolonate HDT | n-butyl acetate* | TMOC | TMOF | p-TSI | Incozol 2 | Inventive Composition |
|---|---|---|---|---|---|---|---|
| 8 | 40 | 55.75 | 0.5 | | | | 4.25 |
| 9 | 40 | 55.75 | | | 0.5 | | 4.25 |
| 10 | 40 | 55.75 | | | | 0.5 | 4.25 |

TMOC = trimethyl orthoacetate
TMOF = trimethyl orthoformate
pTSI = p-toluene sulfonyl isocyanate
Incozol 2 = oxazolane additive
Inventive composition = 3 parts 2,6-di-t-butyl hydroxytoluene and 16 parts methyl para-toluenesulfonate in 150 parts butyl acetate (0.47% actives)
*The moisture amount in n-butyl acetate is over 1000 ppm The stability observations for the eleven-week period at 50° C. for the formulations are set forth in Table II.

TABLE II

| Formulation No. | 0 weeks | 1 week | 2 weeks | 3 weeks | 4 weeks |
|---|---|---|---|---|---|
| 1 | OK | Turbidity | — | — | — |
| 2 | OK | Turbidity | — | — | — |
| 3 | OK | OK | OK | OK | Precipitation |
| 4 | OK | OK | Yellowing | — | — |
| 5 | OK | Turbidity | — | — | — |
| 6 | OK | OK | OK | OK | OK |
| 7 | OK | OK | OK | OK | OK |
| 8 | OK | OK | OK | OK | OK |
| 9 | OK | OK | OK | OK | OK |
| 10 | OK | OK | OK | OK | OK |

| Formulation No. | 5 weeks | 7 weeks | 9 weeks | 10 weeks | 11 weeks |
|---|---|---|---|---|---|
| 1 | — | — | — | — | — |
| 2 | — | — | — | — | — |
| 3 | — | — | — | — | — |
| 4 | — | — | — | — | — |
| 5 | — | — | — | — | — |
| 6 | OK | OK | OK | OK | OK |
| 7 | OK | OK | OK | OK | OK |
| 8 | OK | OK | OK | OK | OK |
| 9 | OK | OK | OK | OK | OK |
| 10 | OK | OK | OK | OK | OK |

The stability observation in Table II demonstrates the instability and drawbacks of the Tolonate HDT in 40% n-butyl acetate formulation alone (Formulation 1) and with prior art moisture scavengers present (Formulations 2 to 5) when high amounts of moisture exist in the solvent. TMOC and Incozol 2 as moisture scavengers caused the Tolonate HDT to become turbid after 1 week, p-TSI caused Tolonate HDT to become yellow after 2 weeks, and TMOF caused a precipitate in Tolonate HDT after 4 weeks. However, Tolonate HDT in 40% n-butyl acetate formulations with or without the prior art moisture, but with the moisture scavenging additives of this invention, were stable at 50° C. even after 11 weeks when the experiment was terminated. It was not possible to obtain such stability results, i.e. without formation of turbidity or a precipitate, for such a Tolonate HDT formulation when either 2,6-di-t-butyl hydroxytoluene or methyl para-toluene sulfonate were added alone to the Tolonate HDT.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A method of scavenging moisture from a polyisocyanate formulation, the method consisting of admixing with a polyisocyanate a moisture scavenging effective amount of:

(a) a t-butylated hydroxytoluene selected from the group consisting of 2,6-ditertiarybutyl hydroxytoluene and 2-tertiarybutyl hydroxytoluene, and (b) an alkyl ester of toluenesulfonic acid comprising at least 90% pure para alkyl ester, and optionally, in at least one organic solvent.

2. The method of claim 1 wherein the alkyl ester of toluenesulfonic acid comprises a $C_1$ to $C_{12}$ alkyl ester.

3. The method of claim 2 wherein the alkyl ester of toluenesulfonic acid is methyl toluenesulfonate.

4. The method of claim 3 wherein the t-butylated hydroxytoluene is 2,6-ditertiarybutyl hydroxytoluene and the organic solvent is present and comprises n-butylacetate.

5. The method of claim 4 wherein the weight ratio of alkyl ester of toluenesulfonic acid to 5-butylated hydroxytoluene is from about 4:1 to about 6:1.

6. The method of claim 5 wherein the moisture scavenging effective amount of the t-butylated hydroxytoluene and alkyl ester of toluenesulfonic acid comprises from about 0.3 to about 0.7 weight % based on the total weight of the polyisocyanate formulation.

7. The method of claim 2 wherein the weight ratio of alkyl ester of toluenesulfonic acid to t-butylated hydroxytoluene is from about 3:1 to about 7:1.

8. The method of claim 7 wherein the moisture scavenging effective amount of the t-butylated hydroxytoluene and alkyl ester of toluenesulfonic acid comprises from about 0.3 to about 0.7 weight % based on the total weight of the polyisocyanate formulation.

9. The method of claim 1 wherein the weight ratio of alkyl ester of toluenesulfonic acid to t-butyl hydroxytoluene is from about 2:1 to about 10:1.

10. The method of claim 9 wherein the moisture scavenging effective amount of the t-butylated hydroxytoluene and alkyl ester of toluenesulfonic acid comprises from about 0.1 to about 3.0 weight % based on the total weight of the polyisocyanate formulation.

11. A polyisocyanate formulation consisting essentially of:
   (1) an organic polyisocyanate,
   (2) a moisture scavenging effective amount of:
      (a) a t-butylated hydroxytoluene selected from 2,6-ditertiarybutyl hydroxytoluene and 2-tertiarybutyl hydroxytoluene, and
      (b) an alkyl ester of toluenesulfonic acid comprising at least 90% para alkylester, and
   (3) optionally at least one organic solvent.

12. A formulation of claim 11 wherein the alkyl ester of toluenesulfonic acid comprises a $C_1$ to $C_{12}$ alkyl ester.

13. A formulation of claim 12 wherein the alkyl ester of toluenesulfonic acid is methyl toluenesulfonate.

14. A formulation of claim 13 wherein the t-butylated hydroxytoluene is 2,6-ditertiarybutyl hydroxytoluene and the organic solvent is present and comprises n-butylacetate.

15. A formulation of claim 14 wherein the weight ratio of alkyl ester of toluenesulfonic acid to 5-butylated hydroxytoluene is from about 4:1 to about 6:1.

16. A formulation of claim 15 wherein the moisture scavenging effective amount of the t-butylated hydroxytoluene and alkyl ester of toluenesulfonic acid comprises from about 0.3 to about 0.7 weight % based on the total weight of the polyisocyanate formulation.

17. A formulation of claim 12 wherein the weight ratio of alkyl ester of toluenesulfonic acid to t-butylated hydroxytoluene is from about 3:1 to about 7:1.

18. A formulation of claim 17 wherein the moisture scavenging effective amount of the t-butylated hydroxytoluene and alkyl ester of toluenesulfonic acid comprises from about 0.3 to about 0.7 weight % based on the total weight of the polyisocyanate formulation.

19. A formulation of claim 11 wherein the weight ratio of alkyl ester of toluenesulfonic acid to t-butyl hydroxytoluene is from about 2:1 to about 10:1.

20. A formulation of claim 19 wherein the moisture scavenging effective amount of the t-butylated hydroxytoluene and alkyl ester of toluenesulfonic acid comprises from about 0.1 to about 3.0 weight % based on the total weight of the polyisocyanate formulation.

21. A moisture scavenging composition for use in scavenging moisture in a polyisocyanate formulation useful for preparing thermosetting polyurethanes therefrom, the moisture scavenging composition consisting essentially of:
   (a) a t-butylated hydroxytoluene selected from the group consisting of 2,6-ditertiarybutyl hydroxytoluene and 2-tertiarybutyl hydroxytoluene, and
   (b) an alkyl ester of toluenesulfonic acid comprising at least 90% para alkyl ester, and
   (c) optionally at least one organic solvent.

22. A moisture scavenging composition of claim 21 wherein the alkyl ester of toluenesulfonic acid comprises a $C_1$ to $C_{12}$ alkyl ester.

23. A moisture scavenging composition of claim 22 wherein wherein the alkyl ester of toluenesulfonic acid is methyl toluenesulfonate.

24. A moisture scavenging composition of claim 23 wherein the t-butylated hydroxytoluene is 2,6-ditertiarybutyl hydroxytoluene and the organic solvent is present and comprises n-butylacetate and further wherein the weight ratio of alkyl ester of toluenesulfonic acid to t-butylated hydroxytoluene is in the range of from about 4:1 to about 6:1.

* * * * *